(12) United States Patent
Lei

(10) Patent No.: US 12,556,307 B2
(45) Date of Patent: Feb. 17, 2026

(54) REDUCING TRANSMISSION OF DATA PACKETS IN DATA TRNASMISSION

(71) Applicant: Tencent Technology (Shenzhen) Company Limited, Guangdong (CN)

(72) Inventor: Yixue Lei, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 312 days.

(21) Appl. No.: 18/219,347

(22) Filed: Jul. 7, 2023

(65) Prior Publication Data

US 2023/0353285 A1 Nov. 2, 2023

Related U.S. Application Data

(63) Continuation of application No. PCT/CN2022/130909, filed on Nov. 9, 2022.

(30) Foreign Application Priority Data

Jan. 28, 2022 (CN) .......................... 202210107643.0

(51) Int. Cl.
*H04L 1/1867* (2023.01)
*H04L 1/12* (2006.01)
(Continued)

(52) U.S. Cl.
CPC ..................................... *H04L 1/12* (2013.01)

(58) Field of Classification Search
CPC .......... H04L 1/12; H04L 1/1887; H04L 43/08; H04L 43/0876; H04W 24/02;
(Continued)

(56) References Cited

U.S. PATENT DOCUMENTS

| 11,032,873 B2* | 6/2021 | Stojanovski | .......... H04W 76/32 |
| 2015/0049649 A1* | 2/2015 | Zhu | ...................... H04W 52/287 |
| | | | 370/329 |

(Continued)

FOREIGN PATENT DOCUMENTS

| CN | 111654884 A | 9/2020 |
| CN | 112770312 A | 5/2021 |

(Continued)

OTHER PUBLICATIONS

Chen et al., "High-performance user plane function (UPF) for the next generation core networks," IET Networks Special Issue: Intelligent Computing: a Promising Network Computing Paradigm, 1Department of CSIE, National Ilan University, Yilan, Taiwan, ISSN 2047-4954, Received on Mar. 5, 2020. (Year: 2020).*

(Continued)

*Primary Examiner* — Alina A Boutah
(74) *Attorney, Agent, or Firm* — ArentFox Schiff LLP

(57) ABSTRACT

In a method for data transmission, a plurality of data packets is received from a user plane function (UPF) entity of a core network. Each of the plurality of data packets is associated with a same service flow identifier. The received plurality of data packets is transmitted to user equipment (UE). When the transmission to the UE of one of the plurality of data packets fails and the one of the plurality of data packets is identified as a first data packet type that affects recovery of at least one other data packet in the plurality of packets, the transmission of the at least one other data packet in the plurality of data packets is stopped.

18 Claims, 6 Drawing Sheets

S310 — Receive data packets transmitted by a UPF entity, the data packets including a service flow identity associated with the data packets S320 — Stop transmitting the other data packets associated with the service flow identity to the UE in a case that data packets that fail to be transmitted to the UE are detected in the data packets associated with the service flow identity, and the data packets that fail to be transmitted will affect the recovery of the other data packets associated with the service flow identity in the process of transmitting the data packets to the UE

(51) Int. Cl.
*H04L 43/08* (2022.01)
*H04L 43/0876* (2022.01)
*H04W 24/02* (2009.01)
*H04W 24/08* (2009.01)
*H04W 28/06* (2009.01)

(58) Field of Classification Search
CPC . H04W 24/08; H04W 72/1221; H04W 28/06; H04W 28/02
See application file for complete search history.

(56) References Cited

U.S. PATENT DOCUMENTS

| | | | | |
|---|---|---|---|---|
| 2021/0250811 A1* | 8/2021 | Guo | .................... | H04W 12/122 |
| 2023/0070702 A1* | 3/2023 | Lei | ....................... | H04W 76/22 |

FOREIGN PATENT DOCUMENTS

| | | | | | |
|---|---|---|---|---|---|
| CN | 112787945 A | | 5/2021 | | |
| CN | 112804707 A | * | 5/2021 | ......... | H04L 43/0852 |
| CN | 112804710 A | * | 5/2021 | ........ | H04W 28/0263 |
| CN | 112804711 A | | 5/2021 | | |
| CN | 110636544 B | * | 9/2022 | ............ | H04W 76/22 |
| CN | 115250506 A | * | 10/2022 | ............ | H04W 76/25 |
| CN | 115250537 A | * | 10/2022 | | |
| CN | 112804710 B | * | 5/2024 | ........ | H04W 28/0263 |
| EP | 4262314 A1 | * | 10/2023 | .......... | H04W 72/542 |
| EP | 4300983 A1 | * | 1/2024 | ............ | H04W 28/12 |
| SG | 11202104007P A | * | 6/2021 | ............ | H04W 36/087 |
| WO | WO-2018039179 A1 | * | 3/2018 | ............ | H04L 1/1825 |
| WO | WO-2021063511 A1 | * | 4/2021 | ............ | H04W 76/15 |
| WO | WO-2023104319 A1 | * | 6/2023 | ........ | H04W 74/0816 |

OTHER PUBLICATIONS

Ganjalizadeh et al., Impact of Correlated Failures in 5G Dual Connectivity Architectures for URLLC Applications, School of Electrical Engineering and Computer Science, KTH Royal Institute of Technology, Sweden, Department of Information Engineering, Computer Science and Mathemati, IEEE 2019. (Year: 2019).*
English Translation of CN 115250506 (Year: 2021).*
International Search Report issued Jan. 20, 2023 in Application No. PCT/CN2022/130909, pp. 1-5.
Office Action and Search Report received for Chinese Patent Application No. 202210107643.0, mailed on Jul. 10, 2025, 21 pages (14 pages of General Translation and 7 pages of Original Document).

* cited by examiner

REDUCING TRANSMISSION OF DATA PACKETS IN DATA TRNASMISSION

RELATED APPLICATIONS

The present application is a continuation of International Application No. PCT/CN2022/130909 filed on Nov. 9, 2022, which claims priority to Chinese Patent Application No. 202210107643.0, filed on Jan. 28, 2022. The entire disclosures of the prior applications are hereby incorporated by reference.

FIELD OF THE TECHNOLOGY

This disclosure relates to the field of computer and communication technologies, including to a data transmission method, a data transmission apparatus, a computer-readable medium, an electronic device, and a computer program product.

BACKGROUND OF THE DISCLOSURE

In 5G and evolving 5G systems, high bandwidth and strong interactive services are important types of services, such as cloud gaming, virtual reality (VR), augmented reality (AR), mixed reality (MR), extended reality (XR), cinematic reality (CR), and the like.

These strong interactive services not only require very high timeliness in transmission, but also greatly increase the amount of data generated by an application layer with the improvement of indicators such as resolution, frame rate and degree of freedom, thereby bringing a significant load to network transmission. The data packet content generated by the application layer of these services needs to be partitioned into a large number of data packets with a low time delay and then transmitted in segments. Once the transmission of one segment fails, even if retransmission is performed, the time delay requirement may not be met. There is no effective solution for this application scenario in related art.

SUMMARY

Embodiments of this disclosure provide a data transmission method, a data transmission apparatus, a non-transitory computer-readable storage medium, an electronic device, and a computer program product, which can improve the transmission efficiency of data packets and are favorable for improving the utilization rate of wireless resources.

Other features and advantages of this disclosure become apparent through the following detailed descriptions or partially learned through the practice of this disclosure.

An embodiment of this disclosure provides a method for data transmission. The method may be performed by a base station for example. In the method, a plurality of data packets is received from a user plane function (UPF) entity of a core network. Each of the plurality of data packets is associated with a same service flow identifier. The received plurality of data packets is transmitted to user equipment (UE). When the transmission to the UE of one of the plurality of data packets fails and the one of the plurality of data packets is identified as a first data packet type that affects recovery of at least one other data packet in the plurality of packets, the transmission of the at least one other data packet in the plurality of data packets is stopped.

An embodiment of this disclosure provides a method of data transmission. The method may be performed by a UPF entity for example. In the method, a plurality of data packets is received from an application server. A same service flow identifier is associated with each of the plurality of data packets. The received plurality of data packets is transmitted to a base station. When the transmission to the base station of one of the plurality of data packets fails and the one of the plurality of data packets is identified as a first data packet type that affects recovery of at least one other data packet in the plurality of packets, the transmission of the at least one other data packet in the plurality of data packets is stopped.

An embodiment of this disclosure provides a data transmission apparatus, including processing circuitry. The processing circuitry is configured to receive a plurality of data packets from a user plane function (UPF) entity of a core network. Each of the plurality of data packets is associated with a same service flow identifier. The processing circuitry is configured to transmit the received plurality of data packets to user equipment (UE). When the transmission to the UE of one of the plurality of data packets fails and the one of the plurality of data packets is identified as a first data packet type that affects recovery of at least one other data packet in the plurality of packets, the processing circuitry is configured to stop the transmission of the at least one other data packet in the plurality of data packets.

An embodiment of this disclosure provides a data transmission apparatus, including processing circuitry. The processing circuitry is configured to receive a plurality of data packets from an application server. The processing circuitry is configured to associate a same service flow identifier with each of the plurality of data packets. The processing circuitry is configured to transmit the received plurality of data packets to a base station. When the transmission to the base station of one of the plurality of data packets fails and the one of the plurality of data packets is identified as a first data packet type that affects recovery of at least one other data packet in the plurality of packets, the processing circuitry is configured to stop the transmission of the at least one other data packet in the plurality of data packets.

An embodiment of this disclosure provides a non-transitory computer-readable storage medium storing instructions which when executed by a processor cause the processor to perform any of the methods for data transmission.

An embodiment of this disclosure provides an electronic device, including: one or more processors; and a storage apparatus, configured to store one or more programs, the one or more programs, when executed by the one or more processors, causing the electronic device to perform any of the methods for data transmission.

An embodiment of this disclosure provides a computer program product or a computer program. The computer program product or the computer program includes a computer instruction, and the computer instruction is stored in a computer-readable storage medium. A processor of a computer device reads the computer instruction from the computer-readable storage medium, and the processor executes the computer instruction to cause the computer device to perform any of the methods for data transmission.

In the technical solutions provided in some embodiments of this disclosure, in the process of receiving the data packets transmitted by the UPF entity and transmitting the data packets to the UE, the base station stops transmitting the other data packets associated with the service flow identity to the UE in a case that data packets that fail to be transmitted to the UE are detected in the data packets associated with the service flow identity, and the data packets that fail to be transmitted will affect the recovery of the other data packets associated with the service flow identity. As a result, when the data packets that fail to be transmitted affect the recovery of the other data packets, that is, the other data packets have become invalid data packets, the transmission of invalid data packets may be reduced, thereby improving the transmission efficiency of data packets and being favorable for improving the utilization rate of wireless resources.

In the technical solutions provided in some embodiments of this disclosure, by determining the association information of the data packets transmitted by the application server according to the attribute information of the data packets from the application server and adding the service flow identity to the data packets according to the association information of the data packets, in the process of transmitting the data packets to the base station device, the UPF entity stops transmitting the other data packets associated with the service flow identity to the base station device in a case that there are data packets that fail to be transmitted to the base station device are detected in the data packets associated with the service flow identity, and the data packets that fail to be transmitted will affect the recovery of the other data packets associated with the service flow identity. As a result, when the data packets that fail to be transmitted affect the recovery of the other data packets, that is, the other data packets have become invalid data packets, transmission of the other data packets is stopped to reduce the transmission of invalid data packets, thereby improving the transmission efficiency of data packets and being favorable for improving the utilization rate of wireless resources.

It is to be understood that the foregoing general descriptions and the following detailed descriptions are merely for illustration and explanation purposes and are not intended to limit this disclosure.

DESCRIPTION OF EMBODIMENTS

Exemplary implementations will now be described more thoroughly with reference to the accompanying drawings. However, the examples of implementations may be implemented in various forms, and implementations are not to be understood as being limited to the examples described herein.

In addition, the features, structures or characteristics described in this disclosure may be combined in one or more embodiments in any appropriate manner. In the following descriptions, details are provided to provide a more comprehensive understanding of the embodiments of this disclosure. However, those skilled in the art are to be aware that the technical solutions in this disclosure may be implemented without all the detail features in the embodiments, one or more specific details may be omitted, or other methods, elements, apparatuses, steps and the like may be used.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely exemplary descriptions, do not need to include all content and operations/steps, and do not need to be performed in the described orders either. For example, some operations/steps may be further divided, while some operations/steps may be combined or partially combined. Therefore, an actual execution order may change according to an actual case.

It is to be understood that "a plurality of" mentioned in the specification means two or more. "And/or" describes an association relationship between associated objects and represents that three relationships may exist. For example, A and/or B may represent the following three cases: only A exists, both A and B exist, and only B exists. The character "/" generally indicates an "or" relationship between the associated objects.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

With the development of the 5th-generation (5G), many multimedia services that require multiple data volumes and short time delays have been applied, such as interactive services including cloud gaming, VR, AR, MR, XR, CR, and the like.

Figure 1:
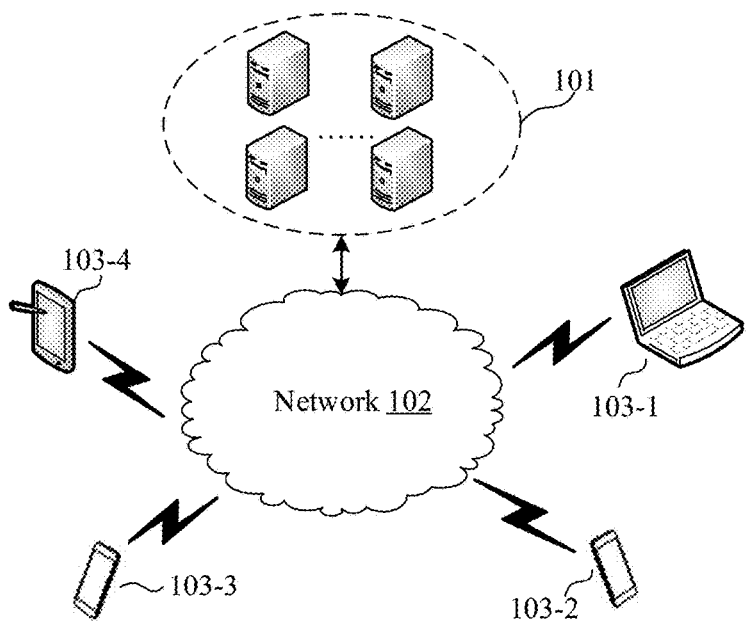
FIG. 1 is a schematic diagram of an exemplary system architecture which can apply the technical solutions in the embodiments of this disclosure.

For example, in a cloud gaming scenario shown in FIG. 1, a cloud server 101 is configured to run cloud gaming, and the cloud server 101 may render a gaming picture, perform coding processing on an audio signal and the rendered image, and finally transmit the coded data obtained by coding processing to a gaming client in each terminal device through a network 102. The terminal device may be user equipment (UE) with a basic streaming media playback capability, human-computer interaction capability, communication capability, and the like. FIG. 1 exemplarily shows UE 103-1, UE 103-2, UE 103-3 and UE 103-4, such as smart phones, tablet personal computers, notebook computers, desk computers, smart televisions, smart appliances and vehicle-mounted terminals. Alternatively, the gaming client may be an application running in a terminal device. The gaming client in the terminal device may decode the coded data transmitted by the cloud server 101 to obtain analog audio and video signals and play the analog audio and video signals.

It is to be understood that FIG. 1 only exemplarily represents a system architecture of a cloud gaming system, but does not limit the specific architecture of the cloud gaming system. For example, in other embodiments, the cloud gaming system may further include a backend server configured for scheduling, and the like. Moreover, the cloud server 101 may be an independent physical server, a server cluster or distributed system composed of a plurality of physical servers, or a cloud server that provides basic cloud computing services, such as cloud services, cloud databases, cloud computing, cloud functions, cloud storage, network services, cloud communications, middleware services, domain name services, security services, content delivery networks (CDNs), big data and artificial intelligence platforms. The gaming client and the cloud server 101 may be directly or indirectly connected in a wired or wireless communication mode, which is not limited in this disclosure.

Figure 2:
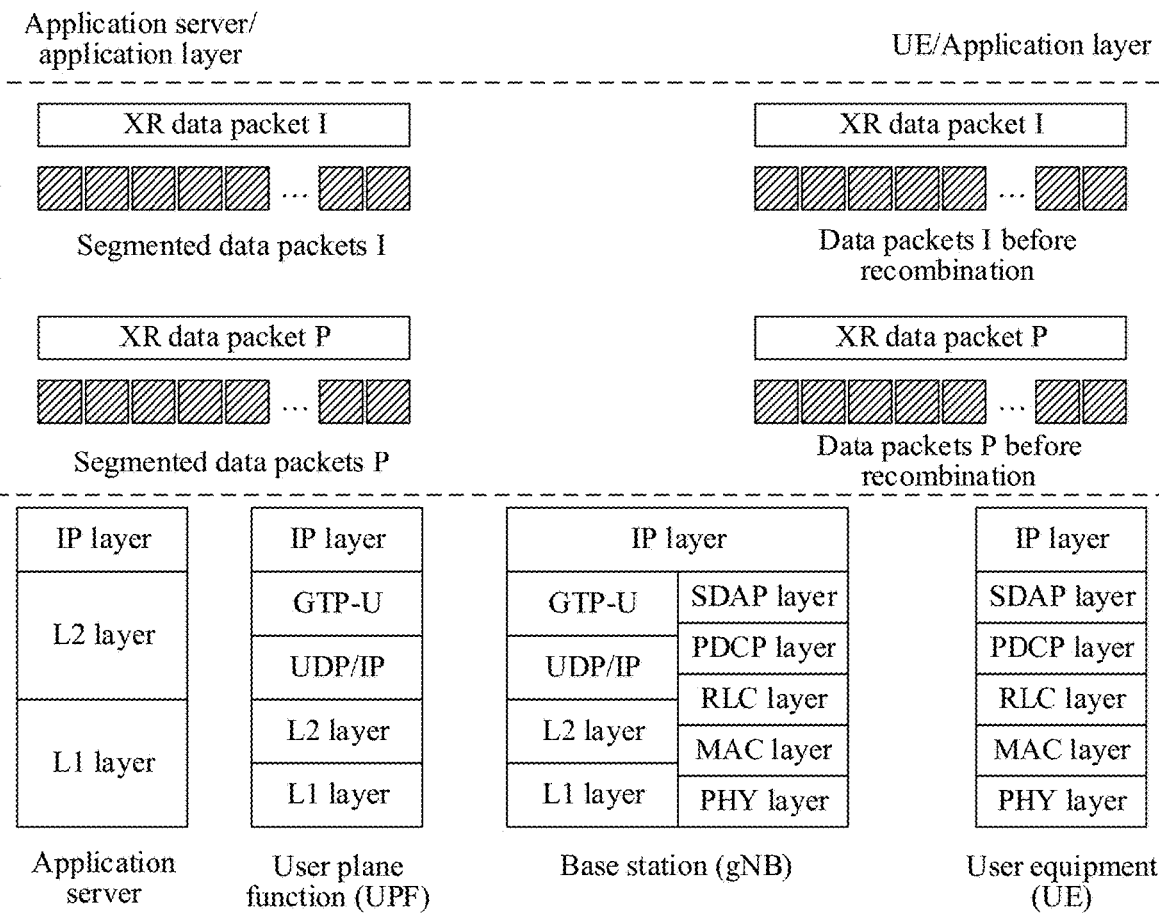
FIG. 2 is a schematic diagram of a transmission process of multimedia data packets according to an embodiment of this disclosure.

In the various multimedia-based interactive service application scenarios mentioned above, due to a large size of a multimedia data packet, the multimedia data packet needs to be segmented into a plurality of data packets to be transmitted during transmission. In an example, as shown in FIG. 2, in a 5G system, a user plane mainly includes an application server (application layer), a user plane function (UPF), a base station (next generation nodeB (gNB)), and UE. The transmission of multimedia data packets is mainly in a downlink direction for some typical service scenarios. For example, multimedia data packets are transmitted from the application server to the UPF, and then transmitted to the UE through the gNB. During transmission, a multimedia data packet (taking an XR data packet as an example in FIG. 2) is segmented at the application layer of the application server, the segmented data packets are transmitted as IP packets from the application server to the UPF, then the 5G system transmits sub-data packets to the UE through PDU sessions, and the sub-data packets are submitted level by level from the protocol stack at the UE and recombined to recover the multimedia data packet.

In the system shown in FIG. 2, the application server includes an Internet protocol (IP) layer (that is, a network layer configured to achieve data transmission between two end systems), an L1 layer, and an L2 layer. The L1 layer refers to a physical layer which is configured to ensure that the original data may be transmitted on various physical media. The L2 layer refers to a data link layer, and the data link layer provides services to the network layer on the basis of the services provided by the physical layer.

A network model of the application server includes: an L1 layer, an L2 layer, a user datagram protocol (UDP)/IP layer, and a general packet radio service tunneling protocol for the user plane (GTP-U) layer.

A network model of the gNB includes an L1 layer, an L2 layer, a UDP/IP layer, a GTP-U layer, and an IP layer. Another network model of the gNB includes a physical layer, a media access control (MAC) layer, a radio link control (RLC) layer, a packet data convergence protocol (PDCP) layer, and a service data adaptation protocol (SDAP) layer.

A network model of the UE includes a PHY layer, an MAC layer, an RLC layer, a PDCP layer, and an SDAP layer.

As mentioned above, for multimedia services, it is common to segment a frame of multimedia data packet into a plurality of data packets to be transmitted. However, during the transmission process of a series of segmented XR data packets (segmented data packets I and segmented data packets P shown in FIG. 2), if one data packet is lost, all associated XRS data packets (data packets I before recombination and data packets P before recombination shown in FIG. 2) may not be effectively recombined after reaching the receiving end. Due to a high time delay requirement, the use of a retransmission mechanism in a network is also difficult to meet the time delay requirement. As a result, relying solely on retransmission is not an effective solution.

Based on this, an embodiment of this disclosure provides a new technical solution which may stop transmitting the other data packets when the data packets that fail to be transmitted affect the recovery of the other data packets, that is, the other data packets have become invalid data packets. As a result, the transmission of invalid data packets may be reduced, thereby improving the transmission efficiency of data packets and being favorable for improving the utilization rate of wireless resources.

The implementation details of the technical solution of this embodiment of this disclosure are described in detail below.

Figure 3:
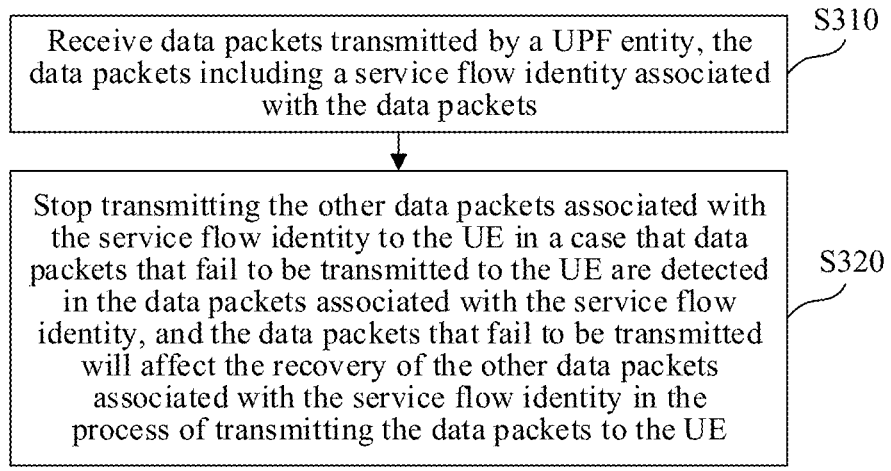
FIG. 3 is a flowchart of a data transmission method according to an embodiment of this disclosure.

FIG. 3 is a flowchart of a data transmission method according to an embodiment of this disclosure. The data transmission method may be performed by a base station device. Referring to FIG. 3, the data transmission method may include step S310 to step S330. A detailed description is as follows:

In step S310, data packets transmitted by a UPF entity are received, the data packets including a service flow identity associated with the data packets. In an example, a plurality of data packets is received from a user plane function (UPF) entity of a core network, each of the plurality of data packets being associated with a same service flow identifier.

It is to be understood that if the control plane and user plane of the base station are separated, that is, the base station is separated into a centralized unit (gNB-CU) and a distributed unit (gNB-DU), and the gNB-CU is used as the control plane and the gNB-DU is used as the user plane, the base station device in this embodiment of this disclosure may be the gNB-DU.

In one embodiment of this disclosure, the service flow identity may correspond to the QoS flow one by one. Alternatively, the service flow identity may also correspond to the UE one by one, that is, one corresponding service flow identity is used for one UE.

In step S320, transmitting of the other data packets associated with the service flow identity to the UE is stopped in a case that data packets that fail to be transmitted to the UE are detected in the data packets associated with the service flow identity, and the data packets that fail to be transmitted will affect the recovery of the other data packets associated with the service flow identity in the process of transmitting the data packets to the UE. In an example, the received plurality of data packets to user equipment (UE) is transmitted. When the transmission to the UE of one of the plurality of data packets fails and the one of the plurality of data packets is identified as a first data packet type that affects recovery of at least one other data packet in the plurality of packets, the transmission of the at least one other data packet in the plurality of data packets is stopped.

In one embodiment of this disclosure, the service flow identity associated with the received data packets may be identified according to the indication information in the protocol field of the received data packets.

For example, the service flow identity may be added to the protocol field of the data packets, so that the service flow identity associated with the received data packets may be identified according to the indication information in the protocol field of the data packets. For example, the protocol field may be the GTP-u tunneling protocol.

In one embodiment of this disclosure, the service flow identity associated with the received data packets may be identified according to the indication information in the payload information of the received data packets. For example, the service flow identity may be added to the payload information of the data packets, so that the service flow identity associated with the received data packets may be identified according to the indication information in the payload information of the data packets.

In this embodiment of this disclosure, if there are data packets that fail to be transmitted and the data packets that fail to be transmitted will affect the recovery of the other data packets associated with the service flow identity, the recovery may not be achieved by continuing to transmit the other data packets, that is, the other data packets have become invalid data packets. As a result, the transmission of the other data packets may be stopped, thereby reducing the transmission of invalid data packets, improving the transmission efficiency of data packets and being favorable for improving the utilization rate of wireless resources.

In one embodiment of this disclosure, the other data packets associated with the service flow identity may also be discarded if data packets that fail to be transmitted to the UE are detected in the data packets associated with the service flow identity, and the data packets that fail to be transmitted will affect the recovery of the other data packets associated with the service flow identity, thereby reducing the occupation of storage resources.

In one embodiment of this disclosure, the data packets transmitted by the UPF entity may further include an importance identity, thereby determining whether the data packets will affect the recovery of the other data packets associated with the service flow identity according to the importance identity in the data packets.

For example, the importance identity may be a key frame, a non-key frame, or other identification information for identifying the importance of data packets.

In one embodiment of this disclosure, the other data packets associated with the service flow identity may also be continued to be transmitted to the UE if data packets that fail to be transmitted to the UE are detected in the data packets associated with the service flow identity, and the data packets that fail to be transmitted will not affect the recovery of the other data packets associated with the service flow identity, thereby ensuring that the data may be transmitted to the UE without affecting the recovery.

In one embodiment of this disclosure, the service flow identity may be an internal identity of a core network, so that the base station device may remove the internal identity of the core network in the data packets before transmitting the data packets to the UE. Similarly, the importance identity in the foregoing embodiment may also be an internal identity of a core network, so that the base station device may also remove the internal identity of the core network in the data packets before transmitting the data packets to the UE.

In one embodiment of this disclosure, the base station device may stop transmitting the other data packets associated with the service flow identity to the UE in a case that all data packets associated with the service flow identity, transmitted by the UPF entity, are not fully received within a set duration, and discard the received other data packets associated with the service flow identity.

In the technical solution of this embodiment of this disclosure, the data packets associated with the service flow identity may be data packets with a time limit requirement. If the base station device does not fully receive all data packets associated with the service flow identity, transmitted by the UPF entity, within a set duration, it indicates that the data packets have exceeded the time limit requirement and there is no need to transmit the data packets to the UE at this time. Of course, if all data packets associated with the service flow identity, transmitted by the UPF entity, are not fully received within a set duration, it may be because the UPF entity detects a data packet transmission error (which may affect the recovery of the other data packets) and then stops transmitting the data packets, it indicates that there is no need to transmit the data packets to the UE. In this case, the transmission of the data packets to the UE may be stopped, and the received data packets may be discarded, thereby reducing the unnecessary data transmission.

FIG. 3 illustrates a data transmission method according to an embodiment of this disclosure from the perspective of a base station device. The following describes a data transmission method according to an embodiment of this disclosure from the perspective of a UPF entity.

Figure 4:
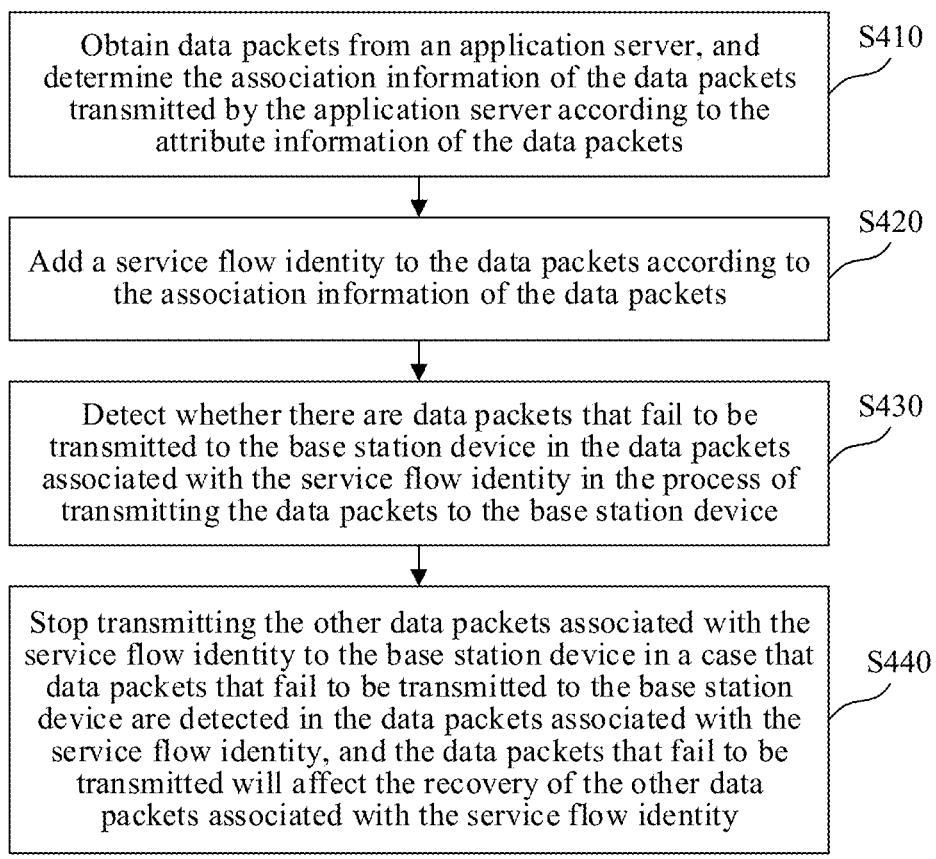
FIG. 4 is a flowchart of a data transmission method according to an embodiment of this disclosure.

FIG. 4 is a flowchart of a data transmission method according to an embodiment of this disclosure. The data transmission method may be performed by a UPF entity. Referring to FIG. 4, the data transmission method may include step S410 to step S440. A detailed description is as follows:

In step S410, data packets are obtained from an application server, and the association information of the data packets transmitted by the application server in determined according to the attribute information of the data packets. In an example, a plurality of data packets is received from an application server.

In one embodiment of this disclosure, the attribute information of the data packets may be the association between a plurality of data packets, and the association information is used for representing whether a plurality of data packets have an association and the specific type of the association.

An example of an association between a plurality of data packets may be as follows: the loss of one data packet will result in the remaining data packets being useless. For example, if a plurality of data packets are obtained by segmenting the same multimedia data file, the loss of one data packet will result in the remaining data packets being unable to be used for recovering the complete multimedia data, thereby leading to the inability to play or the occurrence of picture or audio lag during the playback process. Based on this, it may be determined that the association information of a plurality of data packets transmitted by the application server is corresponding to the same multimedia data file.

An example of another association between a plurality of data packets may be as follows: a plurality of data packets correspond to the same service flow. For example, the multimedia data encapsulated in a plurality of data packets is streaming media data from the same video conference or live streaming room, and then, it may be determined that the association information of a plurality of data packets transmitted by the application server is corresponding to the same service flow.

In step S420, a service flow identity is added to the data packets according to the association information of the data packets. In an example, a a same service flow identifier is with associated each of the plurality of data packets.

In one embodiment of this disclosure, if there are associated data packets, a same service flow identity may be added to the data packets.

In one embodiment of this disclosure, the service flow identity may correspond to the QoS flow identity one by one. Alternatively, the service flow identity may also correspond to the UE one by one, that is, one corresponding service flow identity is used for one UE. Alternatively, the service flow identity may also correspond to a multimedia data identity one by one, and the multimedia data identity may be a serial number or an electronic fingerprint (such as a hash code).

In one embodiment of this disclosure, the importance of the data packets transmitted by the application server may be determined according to the attribute information of the data packets, and then, an importance identity is added to the data packets according to the importance of the data packets, where the importance identity is used for determining whether the failure to transmit the data packets will affect the recovery of the other data packets associated with the service flow identity. For example, the attribute information of the data packets may be frame category information of the data packets, such as key frames or non-key frames.

In step S430, whether there are data packets that fail to be transmitted to the base station device in the data packets associated with the service flow identity is detected in the process of transmitting the data packets to the base station device.

In step S440, transmitting of the other data packets associated with the service flow identity to the base station device is stopped in a case that data packets that fail to be transmitted to the base station device are detected in the data packets associated with the service flow identity, and the data packets that fail to be transmitted will affect the recovery of the other data packets associated with the service flow identity. In an example, the received plurality of data packets is transmitted to a base station. When the transmission to the base station of one of the plurality of data packets fails and the one of the plurality of data packets is identified as a first data packet type that affects recovery of at least one other data packet in the plurality of packets, the transmission of the at least one other data packet in the plurality of data packets is stopped.

In this embodiment of this disclosure, if there are data packets that fail to be transmitted and the data packets that fail to be transmitted will affect the recovery of the other data packets associated with the service flow identity, the recovery may not be achieved by continuing to transmit the other data packets, that is, the other data packets have become invalid data packets. As a result, the transmission of the other data packets may be stopped, thereby reducing the transmission of invalid data packets, improving the transmission efficiency of data packets and being favorable for improving the utilization rate of wireless resources.

In one embodiment of this disclosure, the other data packets associated with the service flow identity may also be discarded if data packets that fail to be transmitted to the base station device are detected in the data packets associated with the service flow identity, and the data packets that fail to be transmitted will affect the recovery of the other data packets associated with the service flow identity, thereby reducing the occupation of storage resources.

In one embodiment of this disclosure, the other data packets associated with the service flow identity may also be continued to be transmitted to the base station device if data packets that fail to be transmitted to the base station device are detected in the data packets associated with the service flow identity, and the data packets that fail to be transmitted will not affect the recovery of the other data packets associated with the service flow identity, thereby ensuring that the data may be transmitted to the UE without affecting the recovery.

The foregoing embodiments respectively explain the technical solutions in the embodiments of this disclosure from the perspectives of the base station device and the UPF entity. The following further explains the technical solutions in the embodiments of this disclosure from the perspective of interaction between various entities.

Figure 5:
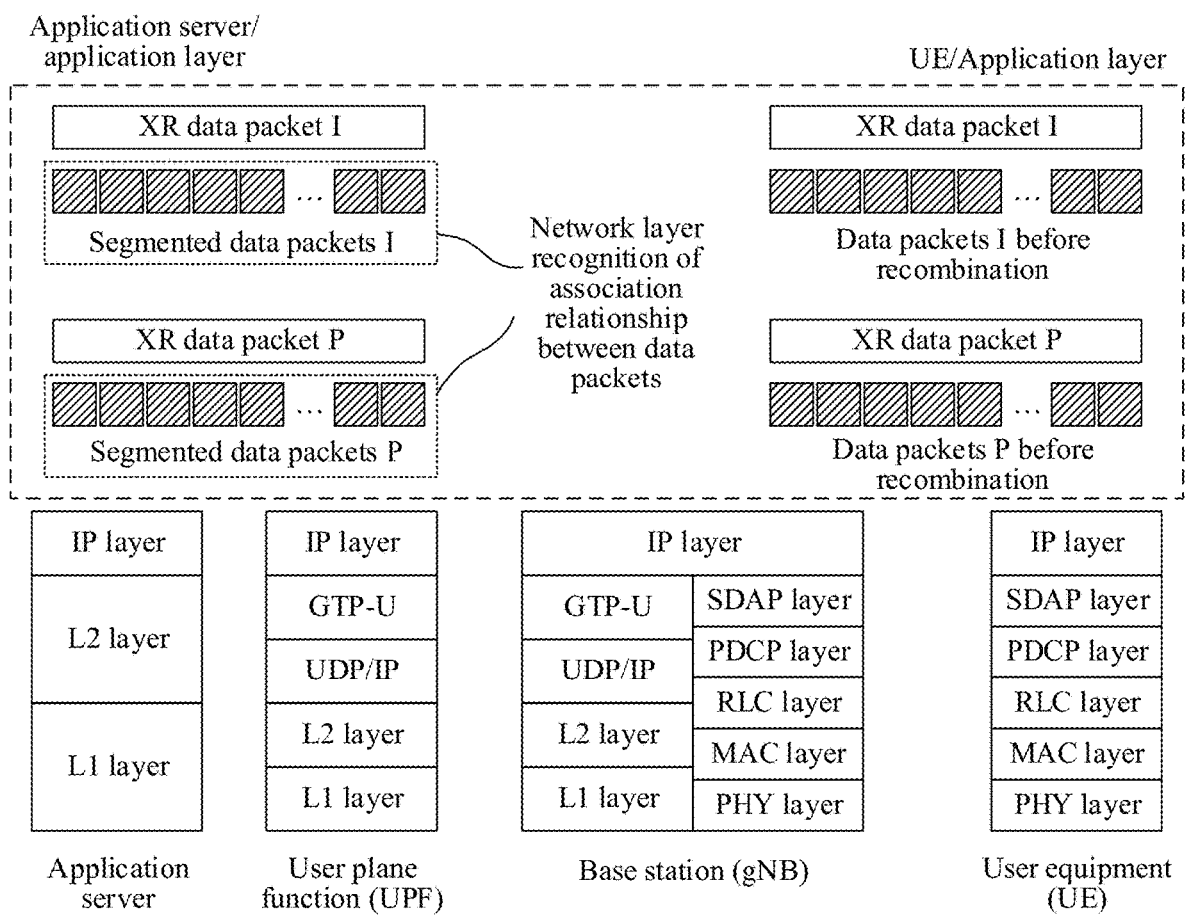
FIG. 5 is a schematic diagram of a transmission process of multimedia data packets according to an embodiment of this disclosure.

In one embodiment of this disclosure, after a multimedia data packet (such as an XR data packet) is segmented, the association relationship between a plurality of data packets obtained by segmenting the multimedia data packet may be identified. As shown in FIG. 5, through negotiation between the application server and the UPF or preliminary definition of protocol provisions, the UPF may identify a series of data packets segmented from the application server. A specific identification method may be as follows: a flow number (that is, a service flow identity) and an in-flow packet number are added to the data packets within the UPF service flow. Since these identities are internal identities of a core network (such as internal identities of a 5G core network), the base station gNB needs to remove these identities before transmitting the data packets to the UE.

For example, the service flow identity may correspond to the QoS flow assigned to the core network one by one, or other particle sizes may also be used. For example, one service flow identity is used for one UE, thereby reducing the number of bits in the flow number to save the number of bytes.

When one packet in a series of data packets is lost during transmission, it is necessary to evaluate the processing mechanism of the subsequent other data packets. The subsequent other data packets may be processed in the following situations:

A) In a case that the lost data packet is an important data packet in a series of data packets having an association relationship, that is, the loss of the data packet will inevitably result in failure of the recovery at a receiving end, the remaining data packets in a series of data packets are discarded.

B) In a case that the lost data packet is a non-important data packet in a series of data packets having an association relationship, that is, the loss of the data packet will not result in failure of the recovery at a receiving end, the remaining data packets in a series of data packets are continued to be transmitted.

For example, important data packets may encapsulate I-frames, and non-important data packets may encapsulate B-frames or P-frames. Of course, other methods may also be used for differentiation, and the other methods include but are not limited to the importance specified by the application layer for data packets at the network layer according to other attributes.

Based on differentiation between the association relationship and importance of the segmented data packets, as an endpoint of a wireless link, the gNB monitors and actively discards data packets, which is favorable for saving wireless network resources.

Figure 6:
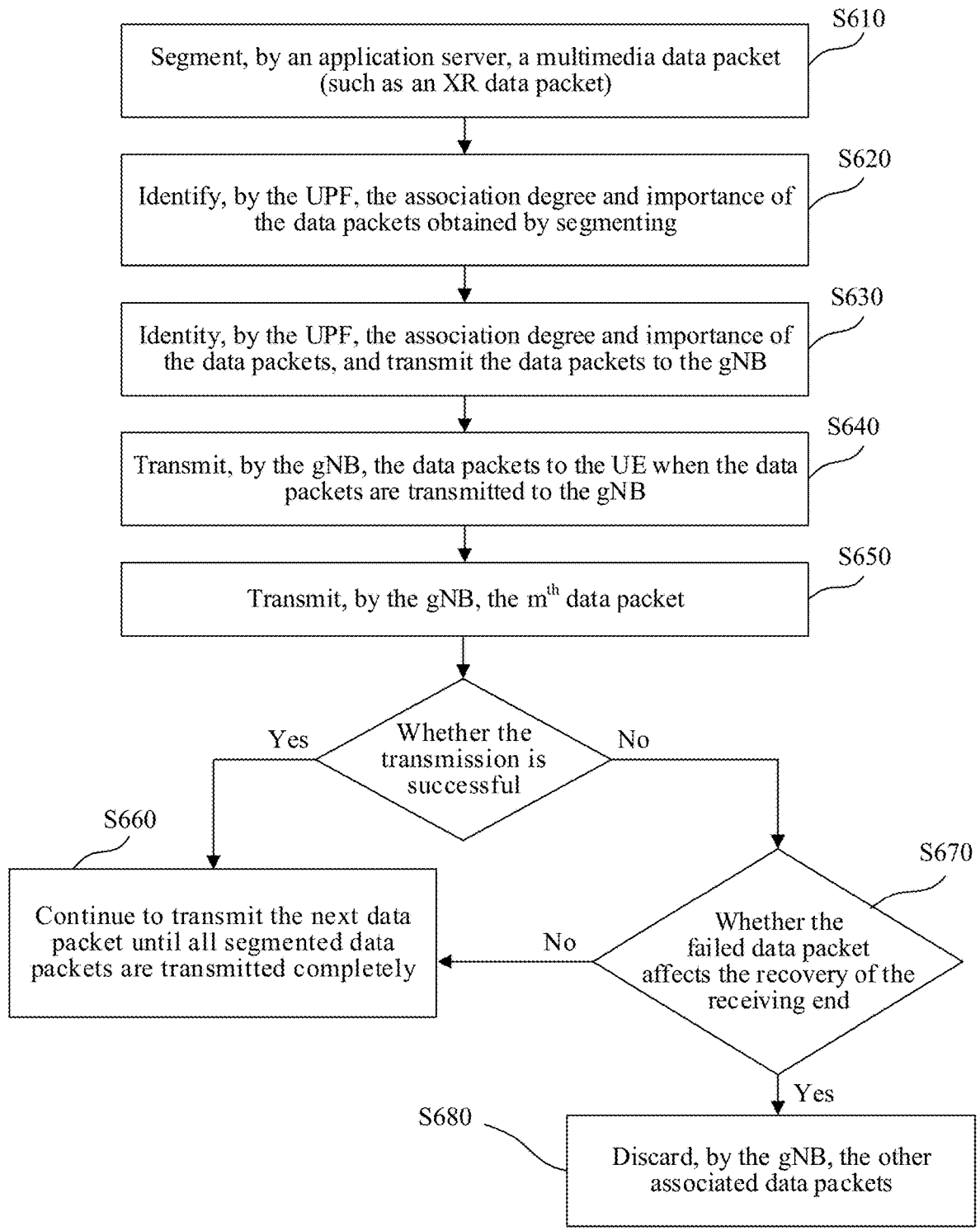
FIG. 6 is a schematic flowchart of transmission of multimedia data packets according to an embodiment of this disclosure.

As shown in FIG. 6, the specific process includes the following steps:

In step S610, an application server segments a multimedia data packet (such as an XR data packet), and transmits the segmented data packets to a UPF.

In one embodiment of this disclosure, the application server may determine the size of a sub-packet according to the information such as the set size of the data packet or the state of a network, and then segment the multimedia data packet according to the size of the sub-packet to obtain a plurality of data packets.

In step S620, the UPF identifies the association degree and importance of the data packets obtained by segmenting.

For example, according to different transport protocols used for data packets, indication information including an association degree identity and an importance identity may be added to the protocol field or payload information of the data packets. For example, the indication information may be added to the field of the data packets transmitted based on the GTP-U tunneling protocol, or the indication information may be added to the header of the data packets transmitted based on the GTP, the header of the data packets transmitted based on the UDP, and the header of the data packets transmitted based on the quick UDP Internet connections (QUIC).

In step S630, the UPF identifies the association degree and importance of the data packets, and transmits the data packets to the gNB.

In one embodiment of this disclosure, the gNB may support IP layer processing and payload information identification, thereby supporting the identification of the association degree and importance of a series of data packets.

In step S640, the gNB transmits the data packets to the UE when the data packets are transmitted to the gNB.

In one embodiment of this disclosure, after receiving the segmented data packets transmitted by the application server, the UPF transmits the data packets to the gNB, and then, the gNB transmits the data packets to the UE.

In step S650, the gNB transmits the $m^{th}$ data packet, where if the transmission is successful, step S660 is performed; and if the transmission fails, step S670 is performed.

In one embodiment of this disclosure, the gNB may transmit sub-data packets to the UE through a Uu interface. Moreover, the success and failure of data transmission may be determined through protocols such as the PDCP and the RLC of the Uu interface.

In step S660, the gNB continues to transmit the next data packet if the transmission is successful until all segmented data packets are transmitted completely.

In step S670, the gNB determines whether the failed data packet affects the recovery of the receiving end if the transmission fails, where if yes, step S680 is performed; and if not, perform S660 is performed.

In step S680, the gNB discards the other associated data packets.

The technical solutions in the embodiments of this disclosure may stop transmitting the other data packets when the data packets that fail to be transmitted affect the recovery of the other data packets, that is, the other data packets have become invalid data packets. As a result, the transmission of invalid data packets may be reduced, thereby improving the transmission efficiency of data packets and being favorable for improving the utilization rate of wireless resources.

The following introduces apparatus embodiments of this disclosure, and the apparatus embodiments may be used for performing the data transmission methods in the foregoing embodiments of this disclosure. For exemplary details of the apparatus embodiments of this disclosure, reference may be made to the embodiments of the foregoing data transmission method in this disclosure.

Figure 7:
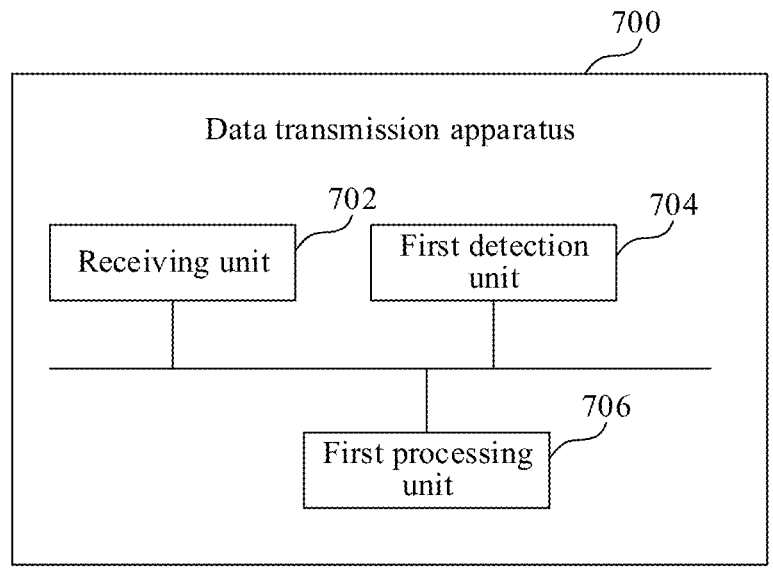
FIG. 7 is a block diagram of a data transmission apparatus according to an embodiment of this disclosure.

FIG. 7 is a block diagram of a data transmission apparatus according to an embodiment of this disclosure. The data transmission apparatus may be arranged in a base station device.

Referring to FIG. 7, a data transmission apparatus 700 according to an embodiment of this disclosure includes: a receiving unit 702, a first detection unit 704, and a first processing unit 706.

The receiving unit 702 is configured to receive data packets transmitted by a UPF entity, the data packets including a service flow identity associated with the data packets; the first detection unit 704 is configured to detect whether there are data packets that fail to be transmitted to the UE in the data packets associated with the service flow identity in the process of transmitting the data packets to UE; and the first processing unit 706 is configured to stop transmitting the other data packets associated with the service flow identity to the UE in a case that data packets fail to be transmitted to the UE are detected in the data packets associated with the service flow identity, and the data packets that fail to be transmitted will affect the recovery of the other data packets associated with the service flow identity.

In some embodiments of this disclosure, based on the foregoing solution, the first processing unit 706 is further configured to: discard the other data packets associated with the service flow identity in a case that data packets that fail to be transmitted to the UE are detected in the data packets associated with the service flow identity, and the data packets that fail to be transmitted will affect the recovery of the other data packets associated with the service flow identity.

In some embodiments of this disclosure, based on the foregoing solution, the data packets also include an importance identity; and the first processing unit 706 is further configured to: determine whether the data packets will affect the recovery of the other data packets associated with the service flow identity according to the importance identity in the data packets.

In some embodiments of this disclosure, based on the foregoing solution, the first processing unit 706 is further configured to: continue to transmit the other data packets associated with the service flow identity to the UE in a case that the first processing unit 706 detects that there are data packets that fail to be transmitted to the UE in the data packets associated with the service flow identity, and the data packets that fail to be transmitted will not affect the recovery of the other data packets associated with the service flow identity.

In some embodiments of this disclosure, based on the foregoing solution, the first processing unit 706 is further configured to: identify the service flow identity associated with the received data packets according to the indication information in the protocol field of the received data packets; or identify the service flow identity associated with the received data packets according to the indication information in the payload information of the received data packets.

In some embodiments of this disclosure, based on the foregoing solution, the service flow identity is an internal identity of a core network; and the first processing unit 706 is further configured to: remove the internal identity of the core network in the data packets before transmitting the data packets to the UE.

In some embodiments of this disclosure, based on the foregoing solution, the first processing unit 706 is further configured to: stop transmitting the other data packets associated with the service flow identity to the UE in a case that all data packets associated with the service flow identity, transmitted by the UPF entity, are not fully received within a set duration, and discard the received other data packets associated with the service flow identity.

In some embodiments of this disclosure, based on the foregoing solution, the service flow identity corresponds to the QoS flow one by one, or the service flow identity corresponds to the UE one by one.

Figure 8:
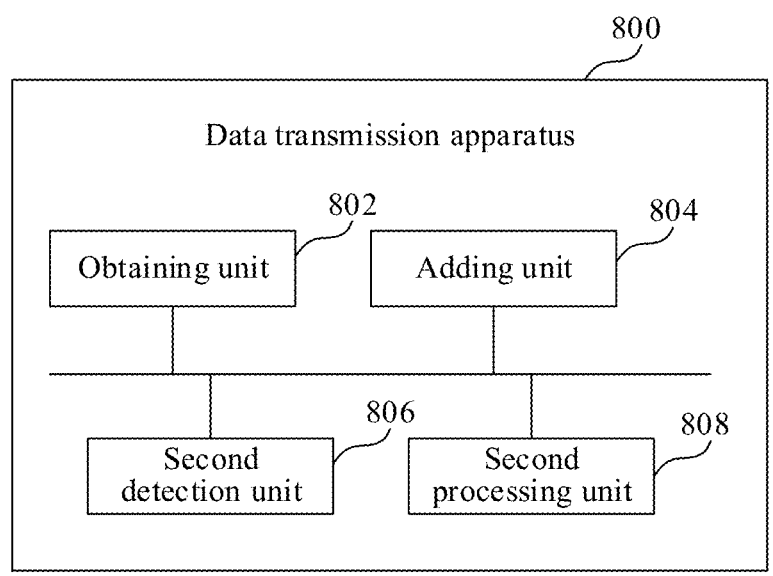
FIG. 8 is a block diagram of a data transmission apparatus according to an embodiment of this disclosure.

FIG. 8 is a block diagram of a data transmission apparatus according to an embodiment of this disclosure. The data transmission apparatus may be arranged in a UPF entity.

Referring to FIG. 8, a data transmission apparatus 800 according to an embodiment of this disclosure includes: an obtaining unit 802, an adding unit 804, a second detection unit 806, and a second processing unit 808.

The obtaining unit 802 is configured to obtain data packets from an application server, and determine the association information of the data packets transmitted by the application server according to the attribute information of the data packets; the adding unit 804 is configured to add a service flow identity to the data packets according to the association information of the data packets; the second detection unit 806 is configured to detect whether there are data packets that fail to be transmitted to the base station device in the data packets associated with the service flow identity in the process of transmitting the data packets to a base station device; and the second processing unit 808 is configured to stop transmitting the other data packets associated with the service flow identity to the base station device in a case that the second detection unit 806 detects that there are data packets that fail to be transmitted to the base station device in the data packets associated with the service flow identity, and the data packets that fail to be transmitted will affect the recovery of the other data packets associated with the service flow identity.

In some embodiments of this disclosure, based on the foregoing solution, the adding unit 804 is further configured to: determine the importance of the data packets transmitted by the application server according to the attribute information of the data packets; and add an importance identity to the data packets according to the importance of the data packets, the importance identity being used for determining whether the failure to transmit the data packets will affect the recovery of the other data packets associated with the service flow identity.

In some embodiments of this disclosure, based on the foregoing solution, the importance of the data packets includes frame category information of the data packets, and the frame category information includes key frames or non-key frames.

Figure 9:
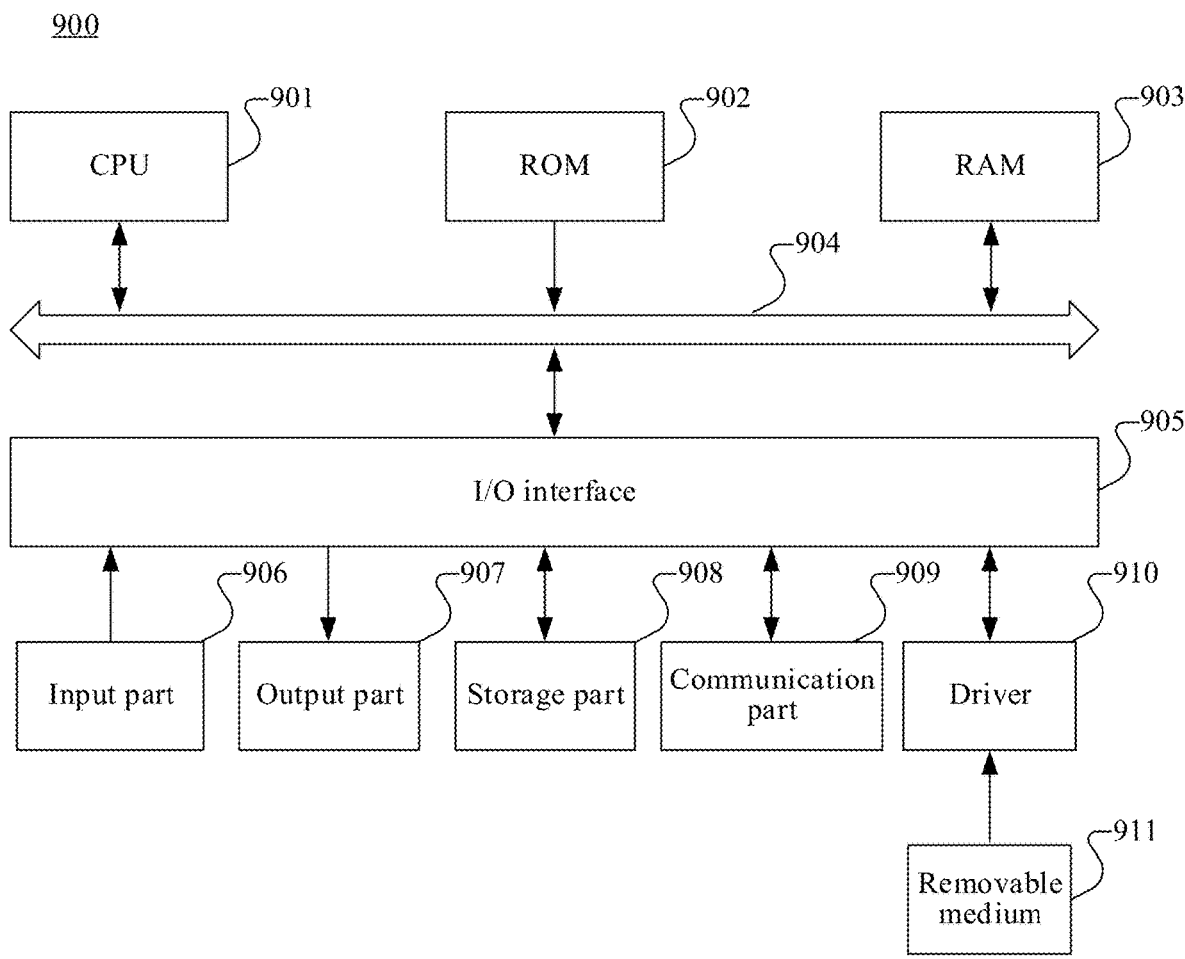
FIG. 9 is a schematic structural diagram of a computer system adapted to implement an electronic device according to an embodiment of this disclosure.

FIG. 9 is a schematic structural diagram of a computer system adapted to implement an electronic device according to an embodiment of this disclosure, which is used for implementing the base station or UPF entity mentioned above.

It is to be understood that the computer system 900 of the electronic device shown in FIG. 9 is merely an example, and does not constitute any limitation on functions and use ranges of the embodiments of this disclosure.

As shown in FIG. 9, the computer system 900 includes a central processing unit (CPU) 901, which may perform various suitable actions and processing based on a program stored in a read-only memory (ROM) 902 or a program loaded from a storage part 908 into a random access memory (RAM) 903, for example, perform the method described in the foregoing embodiments. The RAM 903 further stores various programs and data required for system operations. The CPU 901, the ROM 902, and the RAM 903 are connected to each other through a bus 904. An input/output (I/O) interface 905 is also connected to the bus 904.

The following components are connected to the I/O interface 905: an input part 906 including a keyboard, a mouse, or the like; an output part 907 including a cathode ray tube (CRT), a liquid crystal display (LCD), a speaker, or the like; a storage part 908 including a hard disk, or the like; and a communication part 909 including a network interface card such as a local area network (LAN) card or a modem. The communication part 909 performs communication processing by using a network such as the Internet. A driver 910 is also connected to the I/O interface 905 as required. A removable medium 911, such as a magnetic disk, an optical disk, a magneto-optical disk, or a semiconductor memory, is installed on the driver 910 as required, so that a computer program read from the removable medium is installed into the storage part 908 as required.

Particularly, according to an embodiment of this disclosure, the processes described in the following by referring to the flowcharts may be implemented as computer software programs. For example, an embodiment of this disclosure includes a computer program product. The computer program product includes a computer program stored in a computer-readable medium. The computer program includes a computer program used for performing a method shown in the flowchart. In such an embodiment, by using the communication part 909, the computer program may be downloaded and installed from a network, and/or installed from the removable medium 911. When the computer program is executed by the CPU 901, the various functions defined in the system of this disclosure are executed.

It is to be understood that the computer-readable medium shown in the embodiments of this disclosure may be a computer-readable signal medium or a computer-readable storage medium or any combination of the two. The computer-readable storage medium may be, for example, but is not limited to, an electric, magnetic, optical, electromagnetic, infrared, or semi-conductive system, apparatus, or component, or any combination of the above. A more specific example of the computer-readable storage medium may include but is not limited to: an electrical connection having one or more wires, a portable computer disk, a hard disk, a random access memory (RAM), a read-only memory (ROM), an erasable programmable read only memory (EPROM), a flash memory, an optical fiber, a portable compact disc read-only memory (CD-ROM), an optical storage device, a magnetic storage device, or any appropriate combination thereof. In this disclosure, the computer-readable storage medium may be any tangible medium containing or storing a program, and the program may be used by or used in combination with an instruction execution system, an apparatus, or a device. In this disclosure, the computer-readable signal medium may include a data signal transmitted in a baseband or as part of a carrier, and stores a computer-readable computer program. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in conjunction with an instruction execution system, an apparatus, or a device. The computer program included in the computer-readable medium may be transmitted by using any suitable medium, including but not limited to: a wireless medium, a wired medium, or any suitable combination thereof.

The flowcharts and block diagrams in the accompanying drawings illustrate possible system architectures, functions and operations that may be implemented by a system, a method, and a computer program product according to various embodiments of this disclosure. Each box in a flowchart or a block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in the accompanying drawing. For example, actually two boxes shown in succession may be performed basically in parallel, and sometimes the two boxes may be performed in a reverse sequence. This is determined by a related function. It should also be noted that, each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described in the embodiments of this disclosure may be implemented in a software manner, or may be implemented in a hardware manner, and the unit described can also be set in a processor. Names of the units do not constitute a limitation on the units in a specific case.

According to another aspect, this disclosure further provides a computer-readable medium, such as a non-transitory computer-readable storage medium. The computer-readable medium may be included in the electronic device described in the foregoing embodiments, or may exist alone and is not assembled in the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. Actually, according to the implementations of this disclosure, the features and functions of two or more modules or units described above may be specifically implemented in one module or unit. On the contrary, the features and functions of one module or unit described above may be further divided to be embodied by a plurality of modules or units.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

According to the foregoing descriptions of the implementations, a person skilled in the art may readily understand that the exemplary implementations described herein may be implemented by using software, or may be implemented by combining software and necessary hardware. Therefore, the technical solutions of the embodiments of this disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of this disclosure.

It should be understood that this disclosure is not limited to the precise structures described above and shown in the accompanying drawings, and various modifications and changes can be made without departing from the scope of this disclosure.

What is claimed is:

1. A method for data transmission, the method comprising:
receiving a plurality of data packets from a user plane function (UPF) entity of a core network, each of the plurality of data packets being associated with a same service flow identifier; and
transmitting the received plurality of data packets to user equipment (UE), wherein
when the transmission to the UE of one of the plurality of data packets fails and the one of the plurality of data packets is identified as a first data packet type that affects recovery of at least one other data packet in the plurality of data packets, the transmission of the at least one other data packet in the plurality of data packets is stopped, and
when the transmission to the UE of the one of the plurality of data packets fails and the one of the plurality of data packets is identified as a second data packet type that will not affect the recovery of the at least one other data packet in the plurality of data packets, the transmission of the at least one other data packet to the UE continues.

2. The method according to claim 1, wherein when the transmission to the UE of the one of the plurality of data packets fails and the one of the plurality of data packets is identified as the first data packet type that affects the recovery of the at least one other data packet in the plurality of data packets, stopping the transmission of any remaining data packets of the plurality of data packets that have not been transmitted.

3. The method according to claim 1, further comprising:
discarding the at least one other data packet associated with the service flow identifier when the transmission of the one of the plurality of data packet fails to be transmitted to the UE.

4. The method according to claim 1, wherein
each of the plurality of data packets is associated with an importance identifier; and
the method further comprises:
determining whether the one of the plurality of data packets will affect the recovery of the at least one other data packet associated with the service flow identifier according to the importance identifier associated with the one of the plurality of data packets.

5. The method according to claim 1, further comprising:
identifying the service flow identifier associated with the received plurality of data packets according to indication information in protocol fields of the received plurality of data packets.

6. The method according to claim 1, further comprising:
identifying the service flow identifier associated with the received plurality of data packets according to indication information in payload information of the received plurality of data packets.

7. The method according to claim 1, wherein
the service flow identifier is an internal identifier of the core network; and
the method further comprises:
removing the internal identifier of the core network in the plurality of data packets before the transmitting the plurality of data packets to the UE.

8. The method according to claim 1, further comprising:
stopping the transmitting the received plurality of data packets when all data packets associated with the service flow identifier are not received from the UPF entity within a set duration; and
discarding remaining data packets of the received plurality of data packets that are associated with the service flow identifier after the set duration.

9. The method according to claim 1, wherein the service flow identifier includes a quality of service (QoS) flow identifier or UE information.

10. A data transmission apparatus, comprising:
processing circuitry configured to:
receive a plurality of data packets from a user plane function (UPF) entity of a core network, each of the plurality of data packets being associated with a same service flow identifier; and
transmit the received plurality of data packets to user equipment (UE), wherein
when the transmission to the UE of one of the plurality of data packets fails and the one of the plurality of data packets is identified as a first data packet type that affects recovery of at least one other data packet in the plurality of data packets, the processing circuitry is configured to stop the transmission of the at least one other data packet in the plurality of data packets, and
when the transmission to the UE of the one of the plurality of data packets fails and the one of the plurality of data packets is identified as a second data packet type that will not affect the recovery of the at least one other data packet in the plurality of data packets, the processing circuitry is configured to continue the transmission of the at least one other data packet to the UE.

11. The data transmission apparatus according to claim 10, wherein the processing circuitry is configured to:
when the transmission to the UE of the one of the plurality of data packets fails and the one of the plurality of data packets is identified as the first data packet type that affects the recovery of the at least one other data packet in the plurality of data packets, stop the transmission of any remaining data packets of the plurality of data packets that have not been transmitted.

12. The data transmission apparatus according to claim 10, wherein the processing circuitry is configured to:
discard the at least one other data packet associated with the service flow identifier when the transmission of the one of the plurality of data packets fails to be transmitted to the UE.

13. The data transmission apparatus according to claim 10, wherein
each of the plurality of data packets includes an importance identifier; and
the processing circuitry is configured to determine whether the one of the plurality of data packets will affect the recovery of the at least one other data packet associated with the service flow identifier according to the importance identifier associated with the one of the plurality of data packets.

14. The data transmission apparatus according to claim 10, wherein the processing circuitry is configured to:
identify the service flow identifier associated with the received plurality of data packets according to indication information in protocol fields of the received plurality of data packets.

15. The data transmission apparatus according to claim 10, wherein the processing circuitry is configured to:
identify the service flow identifier associated with the received plurality of data packets according to indication information in payload information of the received plurality of data packets.

16. The data transmission apparatus according to claim 10, wherein
the service flow identifier is an internal identifier of the core network; and
the processing circuitry is configured to remove the internal identifier of the core network in the plurality of data packets before the transmitting the plurality of data packets to the UE.

17. The data transmission apparatus according to claim 10, wherein the processing circuitry is configured to:
stop the transmitting the received plurality of data packets when all data packets associated with the service flow identifier are not received from the UPF entity within a set duration; and
discard remaining data packets of the received plurality of data packets that are associated with the service flow identifier after the set duration.

18. A non-transitory computer-readable storage medium, storing instructions which when executed by a processor cause the processor to perform:
receiving a plurality of data packets from a user plane function (UPF) entity of a core network, each of the plurality of data packets being associated with a same service flow identifier; and
transmitting the received plurality of data packets to user equipment (UE), wherein
when the transmission to the UE of one of the plurality of data packets fails and the one of the plurality of data packets is identified as a first data packet type that affects recovery of at least one other data packet in the plurality of data packets, the transmission of the at least one other data packet in the plurality of data packets is stopped, and
when the transmission to the UE of the one of the plurality of data packets fails and the one of the plurality of data packets is identified as a second data packet type that will not affect the recovery of the at least one other data packet in the plurality of data packets, the transmission of the at least one other data packet to the UE continues.

* * * * *